United States Patent
Rieul et al.

(10) Patent No.: US 7,693,307 B2
(45) Date of Patent: Apr. 6, 2010

(54) METHOD AND APPARATUS FOR IRIS RECOGNITION

(75) Inventors: François Rieul, Saint-Germain en Laye (FR); Martin Cottard, Vaucresson (FR); Vincent Bouatou, Paris (FR); Aurélie Morin, Eragny sur Oise (FR)

(73) Assignee: Sagem Defense Securite, Paris (FR)

( * ) Notice: Subject to any disclaimer, the term of this patent is extended or adjusted under 35 U.S.C. 154(b) by 939 days.

(21) Appl. No.: 10/582,933

(22) PCT Filed: Dec. 14, 2004

(86) PCT No.: PCT/FR2004/003213
§ 371 (c)(1),
(2), (4) Date: Jun. 15, 2006

(87) PCT Pub. No.: WO2005/062235
PCT Pub. Date: Jul. 7, 2005

(65) Prior Publication Data
US 2007/0110284 A1    May 17, 2007

(30) Foreign Application Priority Data
Dec. 18, 2003   (FR) .................................. 03 14883

(51) Int. Cl.
G06K 9/00   (2006.01)
G02C 1/04   (2006.01)
G06T 1/00   (2006.01)
G06T 7/00   (2006.01)

(52) U.S. Cl. ...................... 382/117; 351/206; 340/5.53; 340/5.83

(58) Field of Classification Search ................. 382/117, 382/119, 116; 351/210, 206; 340/5.53, 5.83
See application file for complete search history.

(56) References Cited

U.S. PATENT DOCUMENTS 5,291,560 A * 3/1994 Daugman .................... 382/117

(Continued)

FOREIGN PATENT DOCUMENTS

| EP | 1 241 634 A2 | 9/2002 |
| WO | WO-01/01329 A1 | 1/2001 |

OTHER PUBLICATIONS

Wildes, R.P., "Iris Recognition: An Emerging Biometric Technology", Proceedings of the IEEE, Sep. 1997, vol. 85, Issue: 9, pp. 1348-1363.*

(Continued)

*Primary Examiner*—John B Strege
(74) *Attorney, Agent, or Firm*—Muncy, Geissler, Olds & Lowe, PLLC

(57) ABSTRACT

The invention relates to an iris recognition method, comprising the steps of acquiring an image of at least one eye of a user in an infrared spectrum, and of processing said image to extract therefrom identification characteristics from the iris as defined by an outer boundary in the eye, the method comprising the steps of:

acquiring an image of the eye in a visible spectrum substantially simultaneously with acquiring the image of the eye in the infrared spectrum; and prior to processing the infrared image, determining the outer boundary of the iris from the image in the visible spectrum.

The invention also provides iris recognition apparatus.

9 Claims, 1 Drawing Sheet

U.S. PATENT DOCUMENTS

| | | | | |
|---|---|---|---|---|
| 5,555,464 | A | * | 9/1996 | Hatlestad .................... 348/266 |
| 5,572,596 | A | * | 11/1996 | Wildes et al. ............... 382/117 |
| 5,956,122 | A | * | 9/1999 | Doster ........................ 351/210 |
| 6,247,813 | B1 | * | 6/2001 | Kim et al. ................... 351/206 |
| 6,252,977 | B1 | | 6/2001 | Salganicoff et al. |
| 6,424,727 | B1 | * | 7/2002 | Musgrave et al. ........... 382/117 |
| 6,714,665 | B1 | * | 3/2004 | Hanna et al. ................ 382/117 |
| 6,785,406 | B1 | * | 8/2004 | Kamada ...................... 382/117 |
| 7,123,751 | B1 | * | 10/2006 | Fujieda ....................... 382/115 |
| 2002/0106112 | A1 | * | 8/2002 | Chen et al. .................. 382/117 |
| 2002/0114495 | A1 | * | 8/2002 | Chen et al. .................. 382/117 |
| 2002/0136435 | A1 | * | 9/2002 | Prokoski ..................... 382/118 |
| 2002/0154794 | A1 | * | 10/2002 | Cho ............................ 382/117 |
| 2003/0011758 | A1 | * | 1/2003 | Ochiai ........................ 356/71 |
| 2003/0095689 | A1 | * | 5/2003 | Vollkommer et al. ....... 382/117 |
| 2003/0152252 | A1 | * | 8/2003 | Kondo et al. ................ 382/117 |

OTHER PUBLICATIONS

Jain Jang, et al., "Efficient Algorithm of Eye Image Check for Robust Iris Recognition System", Computer Analysis of Images and Patterns 10th International Conference, CAIP 2003, Groningen, The Netherlands, Aug. 25-27, 2003, Proceedings.*

Daugman, "Statistical Richness of Visual Phase Information: Update on Recognizing Persons by Iris Patterns" International Journal of Computer Vision, vol. 45, No. 1, Oct. 2001, pp. 25-38.*

Ali et al "An Iris Recognition System to Enhance E-security Environment Based on Wavelet Theory", Advanced Modeling and Optimization, vol. 5, No. 2, 2003.*

* cited by examiner

METHOD AND APPARATUS FOR IRIS RECOGNITION

The present invention relates to a method and apparatus for iris recognition and suitable for use in verifying identity or in controlling access to a protected site, for example.

BACKGROUND OF THE INVENTION

The iris recognition methods in the most widespread use comprise steps of acquiring an image of at least one eye of the user in an infrared spectrum, and of processing the image in order to extract identification characteristics of the iris as defined in the eye by an outer boundary. The identification characteristics relate to patterns that are present in the iris and that are specific to each individual.

Image acquisition was initially performed in the visible spectrum, but it was found that automatic pattern recognition was not very reliable for irises of dark color in which the patterns present little contrast. Image acquisition in the visible spectrum was quickly replaced by image acquisition in the infrared spectrum where the patterns present a high degree of contrast when compared with the remainder of the iris, thereby facilitating automatic recognition, regardless of the color of the iris.

Automatic recognition of iris patterns requires a prior step of locating the inner and outer boundaries of the iris in the image of the eye. Unfortunately, it has been found that although this operation presents no difficulties for the inner boundary, the outer boundary is sometimes located in inexact manner. It is found that in the infrared spectrum, the iris presents low contrast relative to the sclera which forms the white of the eye on the anterior portion thereof.

OBJECT OF THE INVENTION

An object of the invention is to mitigate the above-specified drawbacks.

BRIEF DESCRIPTION OF THE INVENTION

To this end, the invention provides an iris recognition method, comprising the steps of acquiring an image of at least one eye of a user in an infrared spectrum, and of processing said image to extract therefrom identification characteristics from the iris as defined by an outer boundary in the eye, the method comprising the steps of:

acquiring an image of the eye in a visible spectrum substantially simultaneously with acquiring the image of the eye in the infrared spectrum; and prior to processing the infrared image, determining the outer boundary of the iris from the image in the visible spectrum.

In the visible spectrum, the iris presents sufficient contrast relative to the white of the eye to enable the outer boundary of the iris to be located reliably.

The method preferably includes the step of extracting at least one colorimetric characteristic of the image in the visible spectrum.

When a cheat seeks to get round a check that makes use of an iris recognition method, it is possible to use a reproduction of the eye of a person normally entitled to pass the check. The reproduction is then made using an ink that is opaque to infrared radiation. However such inks are dark in the visible spectrum. Thus, when the authorized user has pale eyes it is possible to reveal the subterfuge by using the calorimetric characteristics. The provision of reproductions is thus made more difficult and expensive.

Advantageously, the identification characteristics are for comparison with iris identification characteristics stored in databases that also contain colorimetric characteristics, and the extracted colorimetric characteristic is used to sort through the database prior to comparing identification characteristics.

The first sort made on the basis of the calorimetric characteristic can accelerate recognition.

The invention also provides iris recognition apparatus for implementing the above method, comprising means for acquiring an image of the eye in an infrared spectrum, and means for acquiring an image of the eye in the visible spectrum.

Other characteristics and advantages of the invention appear on reading the following description of non-limiting particular embodiments of the invention.

BRIEF DESCRIPTION OF THE DRAWING

Reference is made to the accompanying drawing, in which.

DETAILED DESCRIPTION OF THE INVENTION

Figure 1:
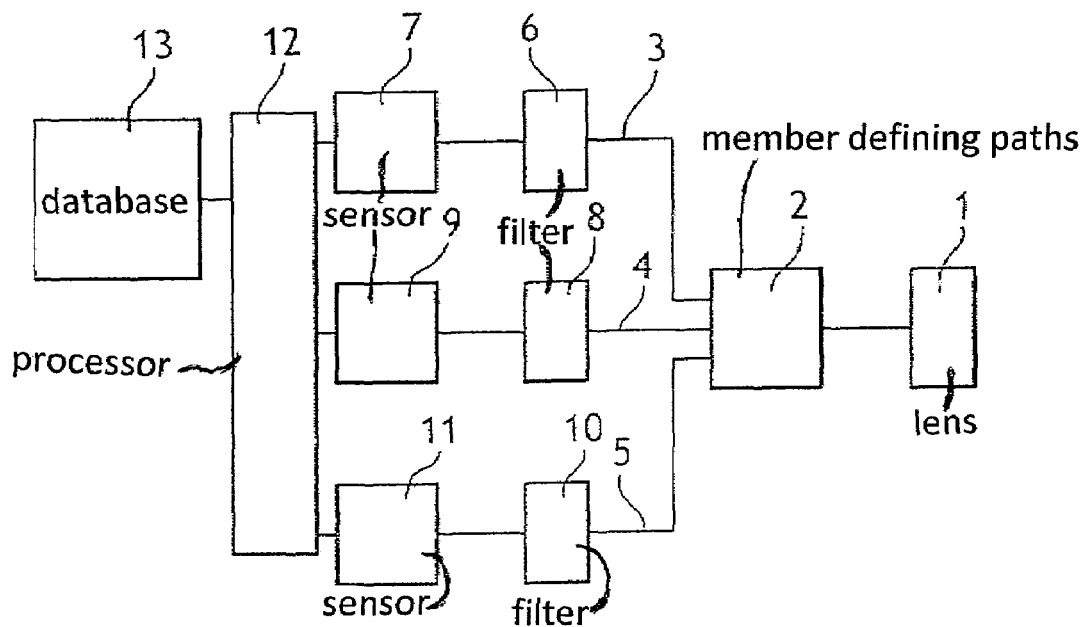
FIG. 1 is a block diagram showing recognition apparatus in a first embodiment.

With reference to FIG. 1, the recognition apparatus of the invention comprises a lens 1 having disposed behind it a member 2 for defining three optical paths 3, 4, 5. The lens 1 is of the macrophotographic type.

The optical path 3 includes a filter 6 that absorbs the infrared spectrum and transmits the blue and green spectrum to a sensor 7 having spectral sensitivity in the blue and the green.

The optical path 4 includes a filter 8 absorbing the infrared and a sensor 9 having spectral sensitivity in the red.

The optical path 5 includes a filter 10 transmitting infrared and a sensor 11 having spectral sensitivity in the near infrared.

The sensors 7, 9, and 11 are charge-coupled devices (CCDs).

The sensors 7, 9, and 11 are connected to a computer processor unit 12, itself connected to a database 13 associating the identities of people with identification characteristics for one or both irises and a calorimetric characteristic for their irises. The identification characteristics may relate, for example, to the iris patterns of those people, and the calorimetric characteristic may be the mean color of the iris or a spectral distribution thereof.

The database 13 is sorted as a function of the calorimetric characteristic.

When a person to be identified is present in front of the apparatus, the sensor 7, 9, and 11 acquire images in the blue-green spectrum, in the red spectrum, and in the near infrared spectrum. The images are acquired substantially simultaneously, i.e. simultaneously or within a lapse of time that is short enough to ensure that the user cannot move significantly.

A search is then made for the inner and outer boundaries of the iris.

The processor unit 12 has no difficulty in locating the inner boundary using the infrared image in which the pupil is highly contrasted relative to the iris.

The processor unit 12 locates the outer boundary either from the image in the blue-green spectrum in which irises of pale colors are highly contrasted relative to the white of the eye, or from the image in the red spectrum in which irises of dark colors are better contrasted relative to the white of the eye.

The inner and outer boundaries are used to determine the zone of the image in the near infrared that corresponds to the iris. Image processing is then performed in the infrared spectrum serving to extract from said image the patterns that constitute the identification characteristics specific to each individual.

The calorimetric characteristic of the iris is extracted from the images in the blue-green spectrum and in the red spectrum by the processor unit 12.

The calorimetric characteristic is used to form a first sort through the database so as to select individuals having a calorimetric characteristic identical to the detected characteristic. This first sort presents the advantage of being particularly fast.

Thereafter, the identification characteristics that have been detected are compared with the identification characteristics of the selected individuals.

Figure 2:
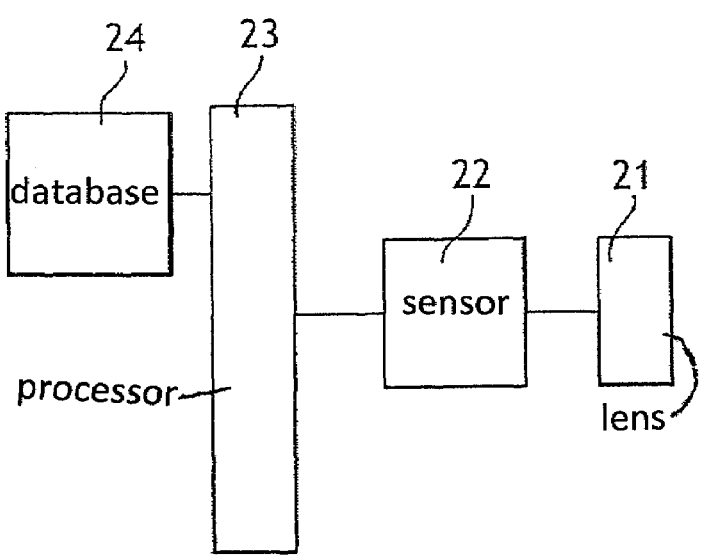
FIG. 2 is a block diagram showing recognition apparatus in a second embodiment of the invention.

With reference to FIG. 2, in the second embodiment of the invention the apparatus of the invention comprises a lens 21 having disposed behind it a sensor 22 with spectral sensitivity covering the visible spectrum and the infrared spectrum. The lens 21 is of the macrophotographic type in this example. By way of example, the sensor 22 is a standard CCD sensor for a color camera from which the infrared attenuation filter has been removed.

The sensor 22 is connected to a processor computer unit 23, itself connected to a database 24.

The method is identical to that described above for the apparatus constituting the first embodiment, the sensor 22 providing an image from which it is possible to obtain an image in at least one visible spectrum and an image in the infrared spectrum. An anti-red filter is preferably placed in front of the sensor 22 so as to prevent red radiation from interfering with the image in the infrared spectrum. This filtering could also be performed by computer processing the image.

Naturally, the invention is not restricted to the embodiments described and variant embodiments could be applied thereto without going beyond the ambit of the invention as defined by the claims.

The sensors 7, 9, 11 could also be complementary metal oxide semiconductor (CMOS) sensors.

The spectra used need not be the same as those described above. One image of the eye is acquired in the infrared spectrum, and another image of the eye is acquired in at least one visible spectrum, selected for example from the following:
black and white;
red;
green;
blue;
from red to green . . . .

The invention claimed is:

1. An iris recognition method, comprising the steps of:
   acquiring an image of at least one eye of a user in an infrared spectrum in an image sensor;
   processing said image to extract therefrom identification characteristics from the iris as defined by an outer boundary in the eye;
   acquiring an image of the eye in a visible spectrum in the image sensor substantially simultaneously with acquiring the image of the eye in the infrared spectrum; and
   prior to processing the infrared image, determining the outer boundary of the iris from the image in the visible spectrum.

2. A method according to claim 1, further comprising the step of extracting at least one colorimetric characteristic of the image in the visible spectrum.

3. A method according to claim 2, wherein the colorimetric characteristic is a spectral distribution.

4. A method according to claim 2, wherein the identification characteristics are compared with iris identification characteristics stored in a database that also contains colorimetric characteristics, and wherein the extracted colorimetric characteristic is used to sort the database prior to comparing the identification characteristics.

5. Iris recognition apparatus for implementing the method of:
   acquiring an image of at least one eye of a user in an infrared spectrum;
   processing said image to extract therefrom identification characteristics from the iris as defined by an outer boundary in the eye;
   acquiring an image of the eye in a visible spectrum substantially simultaneously with acquiring the image of the eye in the infrared spectrum; and
   prior to processing the infrared image, determining the outer boundary of the iris from the image in the visible spectrum;
   the apparatus comprising:
      a first image acquisition device which acquires an image of the eye in the infrared spectrum; and, a second image acquisition device which acquires an image of the eye in a visible spectrum.

6. Apparatus according to claim 5, wherein said first image acquisition device includes a sensor having spectral sensitivity in the infrared and said second image acquisition device includes at least one sensor having spectral sensitivity in the visible.

7. Apparatus according to claim 6, wherein said second image acquisition device includes a sensor having spectral sensitivity in the red and a sensor having spectral sensitivity in the blue and the green.

8. Apparatus according to claim 5, wherein a sensor having spectral sensitivity covering both the visible and the near infrared is used in both the image acquisition devices.

9. Apparatus according to claim 5, wherein each acquisition device includes a filter.

* * * * *